United States Patent
Daimer

(10) Patent No.: US 9,689,425 B2
(45) Date of Patent: Jun. 27, 2017

(54) EXHAUST GAS TURBOCHARGER WITH VIBRATION-INSULATING MOUNTING OF A ROTOR

(71) Applicant: Bosch Mahle Turbo Systems GmbH & Co. KG, Stuttgart (DE)

(72) Inventor: Guido Daimer, Remseck (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 385 days.

(21) Appl. No.: 14/323,773

(22) Filed: Jul. 3, 2014

(65) Prior Publication Data

US 2015/0010387 A1 Jan. 8, 2015

(30) Foreign Application Priority Data

Jul. 4, 2013 (DE) .......................... 10 2013 213 172

(51) Int. Cl.
*F16C 27/04* (2006.01)
*F04D 29/66* (2006.01)
(Continued)

(52) U.S. Cl.
CPC ............ *F16C 27/04* (2013.01); *F01D 25/164* (2013.01); *F04D 25/024* (2013.01); *F04D 29/059* (2013.01); *F04D 29/4206* (2013.01); *F04D 29/668* (2013.01); *F16F 1/324* (2013.01); *F16F 1/34* (2013.01); *F05D 2220/40* (2013.01); *F05D 2240/54* (2013.01); *F05D 2250/314* (2013.01); *F05D 2250/713* (2013.01);
(Continued)

(58) Field of Classification Search
CPC . F01D 25/164; F16F 1/324; F16F 1/34; F16C 35/077; F04D 29/668
See application file for complete search history.

(56) References Cited

U.S. PATENT DOCUMENTS

| 4,872,767 A * | 10/1989 | Knapp | F01D 25/164 384/535 |
| 4,985,973 A * | 1/1991 | Yoshimura | F16F 1/324 192/89.25 |
| 7,478,952 B2 * | 1/2009 | Faust | F16C 27/04 384/535 |
| 7,553,123 B2 * | 6/2009 | Casaro | F01D 25/164 384/536 |

(Continued)

FOREIGN PATENT DOCUMENTS

| DE | 10307842 A1 | 9/2003 |
| DE | 102004004870 A1 | 8/2005 |

(Continued)

OTHER PUBLICATIONS

English Translation of JP 3485486 (Espacenet).*
English abstract for DE-102004004870.
German Search Report for DE-102013213172.0, dated Feb. 6, 2014.

*Primary Examiner* — Dwayne J White
*Assistant Examiner* — Topaz L Elliott
(74) *Attorney, Agent, or Firm* — Fishman Stewart PLLC

(57) ABSTRACT

An exhaust gas turbocharger may include a rotor mounted in a bearing housing via a rolling bearing. The rolling bearing may include an outer shell, an inner shell and rolling bodies running therebetween. At least one annular and vibrational noise absorbing diaphragm spring element may be arranged between the outer shell of the rolling bearing and the bearing housing. The diaphragm spring element may mount the rotor in radial direction and axial direction in a vibration-insulating manner with respect to the bearing housing.

19 Claims, 1 Drawing Sheet

(51) Int. Cl.
  *F16F 1/34*     (2006.01)
  *F16F 1/32*     (2006.01)
  *F04D 29/059*   (2006.01)
  *F04D 29/42*    (2006.01)
  *F01D 25/16*    (2006.01)
  *F16C 35/077*   (2006.01)
  *F16C 19/52*    (2006.01)
  *F16C 19/18*    (2006.01)
  *F04D 25/02*    (2006.01)

(52) U.S. Cl.
  CPC ........ *F05D 2260/96* (2013.01); *F16C 19/184* (2013.01); *F16C 19/527* (2013.01); *F16C 35/077* (2013.01); *F16C 2360/24* (2013.01)

(56) References Cited

U.S. PATENT DOCUMENTS

| | | | | |
|---|---|---|---|---|
| 8,585,005 B2 * | 11/2013 | Krempel | ............ | B60H 1/00457 |
| | | | | 248/560 |
| 8,636,413 B2 * | 1/2014 | Fiedler | .................. | F01D 25/164 |
| | | | | 384/535 |
| 2012/0051906 A1 | 3/2012 | House et al. | | |

FOREIGN PATENT DOCUMENTS

| | | | | |
|---|---|---|---|---|
| DE | 102010004870 A1 | 7/2011 | | |
| DE | 112010001913 T5 | 6/2012 | | |
| EP | 2535607 A1 | 12/2012 | | |
| JP | 3485486 B2 * | 1/2004 | .............. | F16F 1/324 |
| SE | EP 2535607 A1 * | 12/2012 | ........... | F01D 25/164 |
| WO | WO-2012/079882 A1 | 6/2012 | | |

* cited by examiner

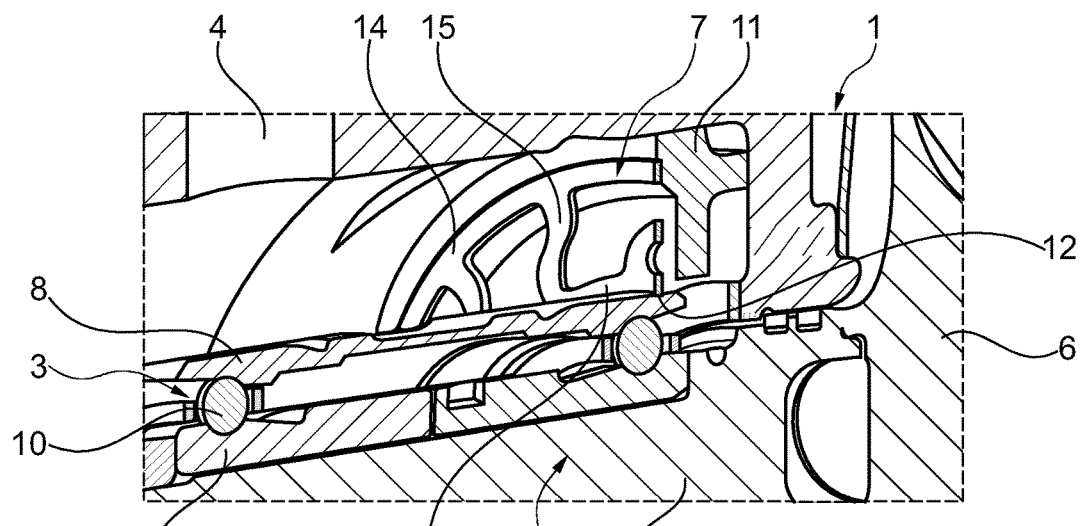
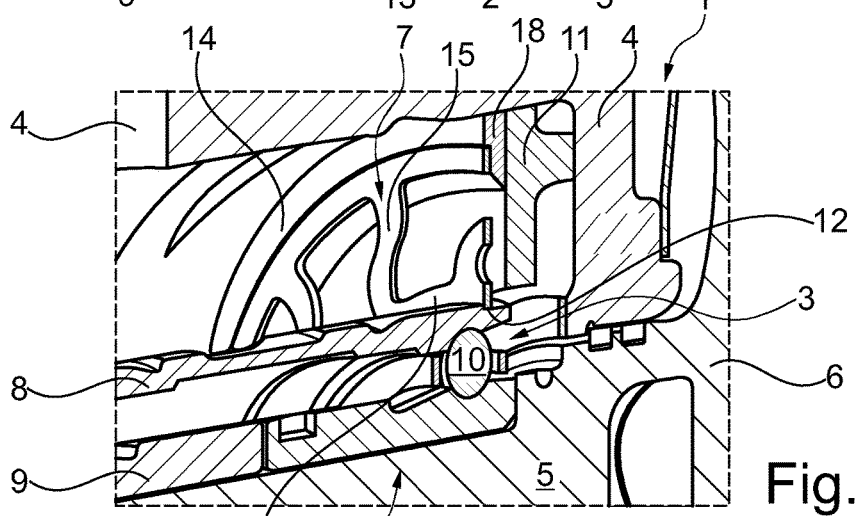
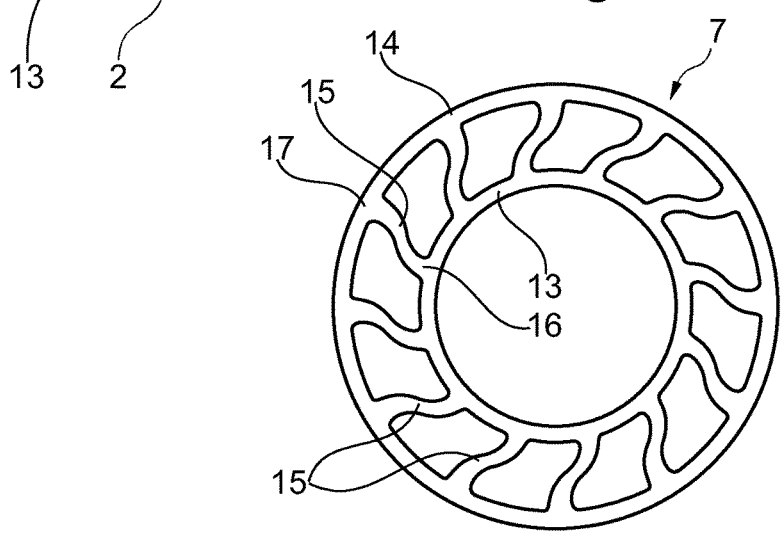

EXHAUST GAS TURBOCHARGER WITH VIBRATION-INSULATING MOUNTING OF A ROTOR

CROSS-REFERENCE TO RELATED APPLICATIONS

This application claims priority to German Patent Application DE 10 2013 213 172.0 filed Jul. 4, 2013, which is hereby incorporated by reference in its entirety.

TECHNICAL FIELD

The present invention relates to an exhaust gas turbocharger with a rotor, which by way of a rolling bearing is mounted in a bearing housing of the exhaust gas turbocharger according to the preamble of claim 1. The invention additionally relates to a diaphragm spring element for such an exhaust gas turbocharger.

BACKGROUND

From DE 10 2004 004 870 A1 a generic exhaust gas turbocharger with a rotor is known, which via a rolling bearing is mounted in a bearing housing of the exhaust gas turbocharger. Here, the rolling bearing has an outer shell, an inner shell and rolling bodies running in between. Here, the outer shell or a mounting enclosing these sleeve-like is clamped in a desired position and/or fixed in the desired position on the bearing housing by means of a retaining or locking device of a material which dampens structure-borne noise vibrations. Transmission of structure-borne noise between the rotor and the bearing housing in particular is at least minimised because of this.

From WO 2012/079882 A1, a further generic exhaust gas turbocharger is known, with which the outer shell of a rolling bearing is resiliently mounted with respect to the bearing housing via a spring ring.

Generally, for improving the mechanical efficiency in modern exhaust gas turbochargers, rolling bearings instead of sliding bearings are employed. A rolling bearing cartridge of the rolling bearing in this case is frequently mounted relative to the bearing housing via a trapped oil film. This is to better dampen in particular load-critical natural frequencies of the rotor which lead to severe deformations of the rotor. Such a trapped oil film dampens the rotor in radial direction but not in axial direction, so that despite all this significant structure-borne noise transmission can occur there through direct component contact for example between the bearing housing and the rolling bearing, which depending on residual unbalance or rotational speed of the rotor enters non-acceptable ranges.

Obviously, there are general approaches for vibration damping or insulation in exhaust gas turbocharger, wherein these approaches are often accomplished making use of plastics or elastomers which have a highly temperature-dependent damping behaviour and do not therefore make possible adequate acoustic vibration damping or vibration insulation. Furthermore, there are no plastics to date which are adequately temperature-stable in order to be employed for example over the entire lifespan on the turbine side of an exhaust gas turbocharger.

SUMMARY

The present invention therefore deals with the problem of stating an improved embodiment for an exhaust gas turbocharger of the generic type, which is characterized in particular by a significantly improved vibration damping with respect to a rotor.

According to the invention, this problem is solved through the subjects of the independent claims. Advantageous embodiments are subject of the dependent claims.

The present invention is based on the general idea of employing an annular and vibrational noise absorbing diaphragm spring element for the vibration-insulating mounting of a rotor namely both in radial direction as well as in axial direction in a bearing housing of an exhaust gas turbocharger, which on the one hand makes possible operating the exhaust gas turbocharger with significantly lower noise emission and at the same time renders a previously required trapped oil film obsolete. The exhaust gas turbocharger according to the invention comprises a rotor, which is mounted in the bearing housing via a rolling bearing in the known manner. The rolling bearing in this case comprises an outer shell, an inner shell as well as rolling bodies running in between, for example needles or balls. According to the invention, at least one, preferentially two annular and vibrational noise absorbing diaphragm spring elements are now provided, which are arranged between the outer shell of the rolling bearing and the bearing housing and which mount the rotor both in radial direction as well as in axial direction in a vibration-reducing or vibration-insulating manner with respect to the bearing housing. Through the diaphragm spring element according to the invention, the rotor is thus not mounted in a vibration-insulating manner as in the past only in radial direction, for example by means of the trapped oil film, but at the same time also in axial direction, so that structure-borne noise transmission which occurred in this region up to now can now be prevented. By using for example two such diaphragm spring elements specifically on the compressor side and the turbine side, an optimised vibration insulation can be achieved with a suitable spring stiffness, without reducing this potential through excessive damping, such as for example through elastomer damping bodies. In addition to the omission of the previously required trapped oil film, higher manufacturing tolerances with respect to the bearing housing or the rolling bearing can also be accepted thanks to the diaphragm spring element according to the invention, as a result of which the manufacturing costs for these parts can be reduced. The diaphragm spring element according to the invention in this case can be formed with respect to the axial and radial stiffness almost independently of one another depending on individually selected embodiment, thus allowing individual adaptation to the respective applicable requirements. When selecting a suitable spring steel for example the spring stiffness can be maintained significantly more independently of the temperature than is the case for example with plastics. A further advantage of the diaphragm spring element according to the invention lies in the omission of additional anti-rotation protection between the rolling bearing and the bearing housing, since the diaphragm spring element is usually connected both to the rolling bearing as well as to the bearing housing in a fixed manner, for example directly or indirectly.

Practically, the diaphragm spring element comprises an outer ring and an inner ring connected with the latter via ribs. The ribs in this case are arranged between the outer ring and the inner ring at an angle with respect to the radial direction and can for example be formed straight or meander-like. Depending on the number of the selected ribs and depending on the selected course of the ribs, the spring stiffness of the diaphragm spring element can be adjusted individually and to suit requirement.

In a further advantageous embodiment of the solution according to the invention, the diaphragm spring element is fixed in the outer shell of the rolling bearing and/or directly or indirectly on the bearing housing, in particular welded, clamped or flanged on. Connecting the diaphragm spring element both to the rolling bearing as well as to the bearing housing makes possible the axial fixing of the rolling bearing or of the rotor subject to simultaneous vibration-damping connection or mounting. The diaphragm spring element according to the invention thus makes possible not only a radial vibration damping but at the same time also a vibration damping in axial direction, as a result of which it can be avoided in particular that the rotor in axial direction for example runs up against the bearing housing and because of this an unacceptable structure-borne noise transmission occurs in this region. By connecting the diaphragm spring element to the bearing housing or the rolling bearing in a fixed manner, an additional previously required anti-rotation protection can be omitted, as a result of which a cost advantage can likewise be achieved. Connecting the diaphragm spring element to the bearing housing can be effected either directly, i.e. through a direct connection of the outer ring of the diaphragm spring element to the bearing housing, or indirectly, i.e. by connecting the outer ring of the diaphragm spring element to a retaining ring arranged between the bearing housing and the diaphragm spring element. Here it is conceivable that this retaining ring is at least partially formed of plastic, in particular comprises an elastomer contact region, via which it is in contact with the diaphragm spring element. Such an elastomer contact region can additionally support the structure-borne noise-damping effect of the diaphragm spring element according to the invention.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

Here it shows, in each case schematically:

FIG. 1 a sectional representation through an exhaust gas turbocharger according to the invention in the region of a diaphragm spring element employed there for mounting a rotor, FIG. 2 a representation as in FIG. 1, however with a differently configured retaining ring, FIG. 3 a view onto a diaphragm spring element according to the invention.

DETAILED DESCRIPTION

According to the FIGS. 1 and 2, an exhaust gas turbocharger 1 according to the invention comprises a rotor 2, which is mounted in a bearing housing 4 of the exhaust gas turbocharger 1 via a rolling bearing 3. The rolling bearing 3 comprises an outer shell 8, an inner shell 9 as well as rolling bodies 10, for example boards, running in between. The outer shell 8 is preferentially formed in one piece and the inner shell 9 is preferentially formed in multiple pieces. The rotor 2 in this case consists of a shaft 5 and a turbine or compressor wheel 6 arranged thereon on the longitudinal end side. In order to now be able to mount the rotor 2 in the bearing housing 4 preferentially in a structure-borne noise reducing manner in particular with respect to critical natural frequencies, an annular and vibrational noise absorbing diaphragm spring element 7 is provided, which is arranged between the outer shell 8 of the rolling bearing 3 and the bearing housing 4 and which mounts the rotor 2 both in axial direction as well as in radial direction in a vibrational noise insulating manner with respect to the bearing housing 4.

With previous mountings of the rotor 2 there was frequently the problem that said rotor was mounted in the bearing housing in a structure-borne noise vibration-reducing manner in radial direction, but not in axial direction, so that when a rotor ran up against the bearing housing in axial direction structure-borne noise transmission which, under certain conditions, was direct, would occur. With the exhaust gas turbocharger 1 according to the invention this is no longer possible since the diaphragm spring element 7 is fixed, in particular welded in, clamped in or flanged on to the outer shell 8 of the rolling bearing 3 and directly or indirectly to the bearing housing 4 via a retaining ring 11. By fixing the diaphragm spring element 7 on the one hand on the rolling bearing 3 and on the other hand directly or indirectly on the bearing housing 4, the rotor 2 can only move in axial direction 12 to a limited degree and do so additionally merely in a cushioned manner. Connecting the diaphragm spring element 7 to the outer shell 8 of the rolling bearing 3 can for example be brought about by a suitable groove 12 on the outer shell 8, in which the diaphragm spring element 7 engages with an inner ring 13. Generally, the diaphragm spring element 7 is constructed of the inner ring 13, an outer ring 14 as well as ribs 15 connecting the two rings 13, 14 (see FIG. 3). Here, the diaphragm spring element 7 can also be introduced into suitable grooves, for example on the retaining ring 11 or on the bearing housing 4 with its outer ring 14, and thereby fixed.

Generally, the diaphragm spring element 7 can be formed of metal, in particular produced as punched part in a cost-effective and economical manner. Considering the diaphragm spring element 7 according to FIG. 3, it is evident that the ribs 15 are arranged at an angle to the radial direction and are additionally formed meander-like. Obviously, a straight design of the individual ribs obliquely to the radial direction is also conceivable. Looking at FIG. 3 in more detail, it is evident that the ribs 15 leave the inner ring 13 at a first connecting point 16 radially in the direction of the outer ring 14 and leave the outer ring 14 at a second connecting point 17 radially in the direction of the inner ring 13. The two connecting points 16, 17 in this case are not located on a common radial ray, but are offset in circumferential direction relative to one another, from which the oblique orientation of the individual ribs 15 and thus also their spring effect results.

The embodiment of the diaphragm spring element 7 according to the invention shown according to FIG. 3 in this case merely constitutes a possible embodiment, while other embodiments are also conceivable, in which the ribs 15 are formed in particular straight and not meander-like.

Looking at the retaining ring 11 according to FIG. 2, it is evident that it is formed at least partially of plastic, in particular comprises an elastomer contact region 18, via which it is in contact with the diaphragm spring element 7. By connecting the outer ring 14 of the diaphragm spring element 7 to the elastomer contact region 18 of the retaining ring 11, structure-borne noise transmitting insulation can be additionally achieved. With the diaphragm spring element 7 according to the invention and in addition to this also with the exhaust gas turbocharger 1 according to the invention, an optimised mounting of the rotor 2 in the bearing housing 4 of the exhaust gas turbocharger 1 can be achieved, which manages in particular without trapped oil film. In addition, greater tolerances with respect to an inner diameter of the bearing housing 4 or an outer diameter of the outer shell 8 of the rolling bearing 3 can be accepted, as a result of which because of the reduced precision requirements the described parts can be produced with lower costs. The axial and radial forces of the rotor 2 which occur during the operation of the exhaust gas turbocharger 1 in this case are counteracted by corresponding spring forces from the diaphragm spring element 7, thereby damping the vibrations. Obviously, clamping of the diaphragm spring element 7 between two elastomer regions 18 of corresponding retaining rings 11 is also conceivable, as a result of which structure-borne noise transmission to the bearing housing 4 can be additionally reduced. The diaphragm spring element 7 can be simply slid or fitted onto the outer shell 8 of the rolling bearing 3, while it is also conceivable that the outer shell 8 consists of two half shells, as a result of which the handling or the assembly are likewise improved.

By way of the material selection for the diaphragm spring element 7 and in particular also the geometrical arrangement or orientation of the individual ribs 15 and their number, the axial or radial spring stiffness of the diaphragm spring element 7 can be individually adjusted. By forming the diaphragm spring element 7 as a cost-effective sheet metal punched part it is not only resistant and can be employed over the entire lifespan of the exhaust gas turbocharger 1, but can also be additionally produced cost-effectively.

The invention claimed is:

1. An exhaust gas turbocharger, comprising:
   a rotor mounted in a bearing housing via a rolling bearing, wherein the rolling bearing includes an outer shell, an inner shell and rolling bodies running therebetween,
   at least one annular and vibrational noise absorbing diaphragm spring element arranged between the outer shell of the rolling bearing and the bearing housing, the diaphragm spring element mounting the rotor in radial direction and axial directions in a vibration-insulating manner with respect to the bearing housing, and
   a retaining ring arranged axially between a radial surface of the bearing housing and a radial surface of the diaphragm spring element.

2. The exhaust gas turbocharger according to claim 1, wherein the diaphragm spring element is formed of metal.

3. The exhaust gas turbocharger according to claim 1, wherein the diaphragm spring element includes an outer ring and an inner ring connected therewith via ribs.

4. The exhaust gas turbocharger according to claim 3, wherein the ribs are arranged at an angle relative to the radial direction.

5. The exhaust gas turbocharger according to claim 3,
   wherein the ribs connect to the inner ring at a first connection point radially in the direction of the outer ring,
   the ribs connect to the outer ring at a second connection point radially in the direction of the inner ring, and
   the first and the second connection points are not located on a common radial ray.

6. The exhaust gas turbocharger according to claim 1, wherein the diaphragm spring element is formed as a punched part.

7. The exhaust gas turbocharger according to claim 1, wherein the diaphragm spring element is at least one of fixed to the outer shell of the rolling bearing and fixed to the bearing housing.

8. The exhaust gas turbocharger according to claim 7, wherein the diaphragm spring element is one of welded in, clamped in, or flanged on to the outer shell of the rolling bearing.

9. The exhaust gas turbocharger according to claim 1, wherein the retaining ring includes a plastic contact region via which the retaining ring is in contact with the diaphragm spring element.

10. A diaphragm spring element for an exhaust gas turbocharger, comprising:
    an annular outer ring connected to an annular inner ring via a plurality of circumferentially spaced ribs, wherein the respective ribs are arranged between the outer ring and the inner ring at an angle with respect to a radial direction and are formed at least one of straight and wavy;
    wherein the inner ring and the outer ring are solid circumferentially.

11. The diaphragm spring element according to claim 10,
    wherein the ribs connect to the inner ring at a first connection point radially in the direction of the outer ring,
    the ribs connect to the outer ring at a second connection point radially in the direction of the inner ring, and
    the first and the second connection point are not located on a common radial ray.

12. The diaphragm spring element according to claim 11, wherein the respective ribs are arranged obliquely to the radial direction.

13. The exhaust gas turbocharger according to claim 4,
    wherein the ribs connect to the inner ring at a first connection point radially in the direction of the outer ring;
    the ribs connect to the outer ring at a second connection point radially in the direction of the inner ring; and
    the first and second connection points are offset in circumferential direction relative to one another.

14. The exhaust gas turbocharger according to claim 7, wherein the diaphragm spring element is fixed to the bearing housing via the retaining ring.

15. The exhaust gas turbocharger according to claim 1, wherein the retaining ring includes an elastomer contact region, the contact region being connected to an outer ring of the diaphragm spring element.

16. An exhaust gas turbocharger, comprising:
    a rotor mounted in a bearing housing via a rolling bearing, the rolling bearing including an outer shell, an inner shell and rolling bodies running therebetween;
    at least one annular diaphragm spring element disposed between the outer shell of the rolling bearing and the bearing housing, the diaphragm spring element including an annular outer ring connected to an annular inner ring via a plurality of circumferential spaced ribs, the ribs being arranged between the outer ring and the inner ring at an angle with respect to a radial direction; and
    a retaining ring arranged axially between a radial surface of the bearing housing and a radial surface of the diaphragm spring element;

wherein the diaphragm spring element is connected to the outer shell of the rolling bearing via the inner ring and is connected to the bearing housing via the outer ring, and wherein the diaphragm spring element mounts the rotor in the radial and axial directions in a vibration-insulating manner with respect to the bearing housing.

17. The exhaust gas turbocharger according to claim 16, wherein the retaining ring includes an elastomer contact region connected to the outer ring of the diaphragm spring element, wherein the outer ring of the diaphragm spring element is fixed to the bearing housing via the retaining ring.

18. The exhaust gas turbocharger according to claim 16, wherein the outer shell of the rolling bearing includes at least one groove into which the inner ring of the diaphragm spring element engages.

19. The exhaust gas turbocharger according to claim 16, wherein the ribs connect to the inner ring at a first connection point radially in the direction of the outer ring;
the ribs connect to the outer ring at a second connection point radially in the direction of the inner ring; and
the first and second connection points are offset in circumferential direction relative to one another.

\* \* \* \* \*